United States Patent [19]

Revels

[11] Patent Number: 4,839,751
[45] Date of Patent: Jun. 13, 1989

[54] TRACK-FOLLOWING SERVO FOR DISK DRIVE WITH MULTIPLE REFERENCE WINDOWS AND TIME DEPENDENT LOGIC CIRCUITRY

[75] Inventor: William R. Revels, San Jose, Calif.

[73] Assignee: Unisys Corporation, Detroit, Mich.

[21] Appl. No.: 24,280

[22] Filed: Mar. 10, 1987

[51] Int. Cl.⁴ .................. G11B 15/04; G11B 5/596
[52] U.S. Cl. .................. 360/60; 360/77.02; 369/43
[58] Field of Search .................. 360/27, 31, 60, 69, 360/75, 77, 78; 369/32, 43, 44

[56] References Cited

U.S. PATENT DOCUMENTS 4,553,182  11/1985  Narita ........................ 360/69
4,734,851  3/1988  Director ...................... 360/69

Primary Examiner—Alan Faber
Assistant Examiner—David L. Robertson
Attorney, Agent, or Firm—John J. McCormack

[57] ABSTRACT

Disclosed is a Fine positioning arrangement for track-follow servo means in a disk drive arrangement wherein servo head output is processed logically to indicate violation by the head of a near-boundry or a far-boundry for prescribed times to indicate whether the transducer is truly "on-center" or not and to logically exclude noise and other error conditions that might compromise this indication.

12 Claims, 10 Drawing Sheets

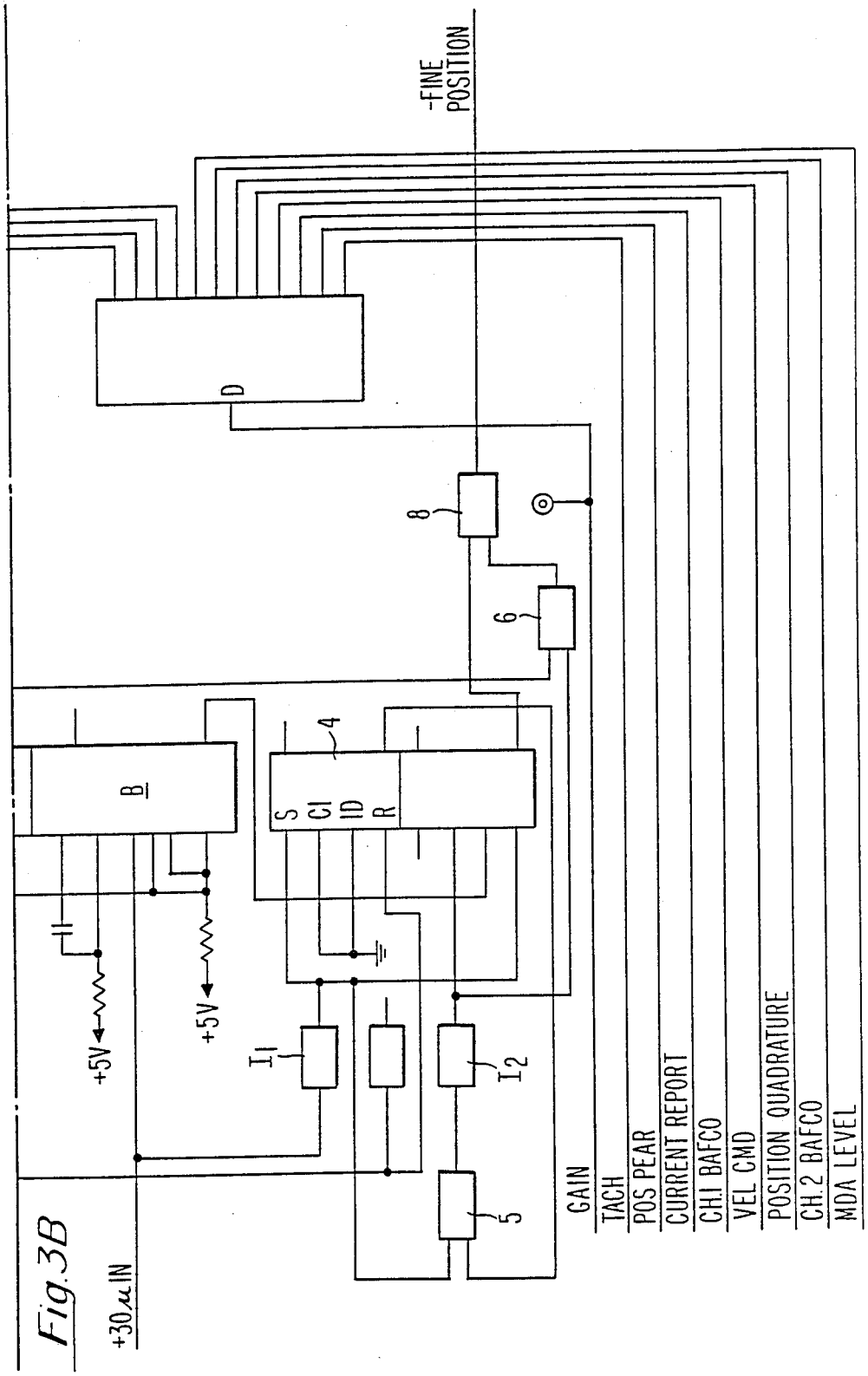

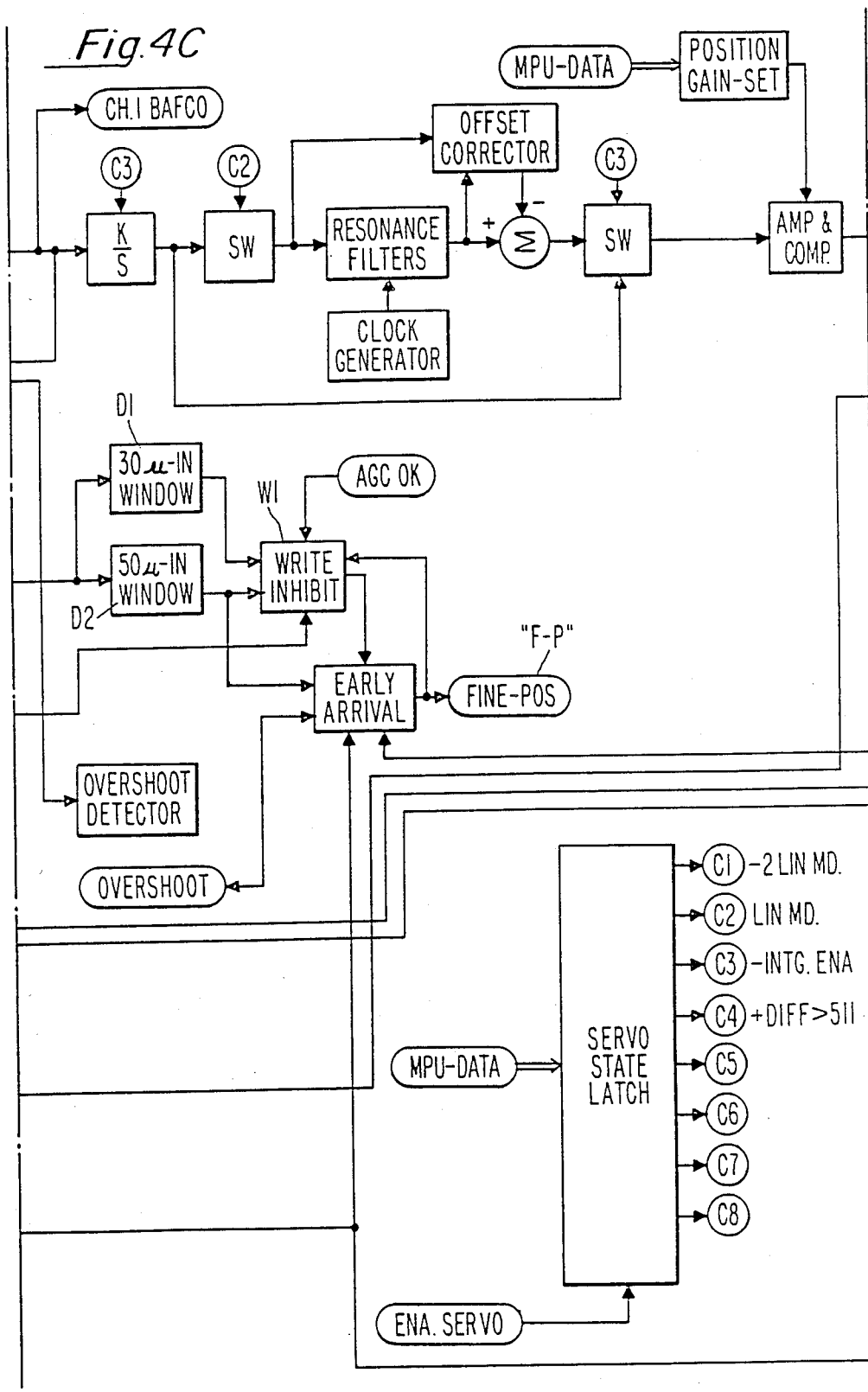

4,839,751

TRACK-FOLLOWING SERVO FOR DISK DRIVE WITH MULTIPLE REFERENCE WINDOWS AND TIME DEPENDENT LOGIC CIRCUITRY

This invention relates to operation of recording equipment and servo arrangements therefor and more particularly it relates to techniques for fine positioning of read/write transducers.

BACKGROUND FEATURES

In arrangements for high density recording on recording disks such as high speed magnetic digital recording for computers, workers are well aware of the difficulty in positioning read/write transducers e.g., in following or centering on a given track once the track has initially been located. For instance, such problems are particularly severe in present day magnetic recording on a stack of disks where at least a portion of a disk face is allocated to servo data [servo tracks]. One common approach is to key upon data signals from a given servo track [e.g., track 1 referencing upon band signals from band one and band zero of the associated servo track]. A vexing problem is knowing when one is really "on-center"—at times defined as being within x inches of the exact radial track center (cylinder). This invention addresses this problem, for instance, reporting when a servo transducer is truly "on-center" and also "off-center"—"on-center" being defined, for instance, as being within a "window" of ±50 uin of the exact cylinder center.

Conventionally, workers have attempted to find track center and to "follow" it by generating and monitoring "position" and "position quadrature" signals derived from the servo head positioning signal [reading-off a selected servo track]. One big problem with this approach is that the conventional techniques have been susceptible to frustration because of "noise", such as the commonly-observed noise spikes from a servo track [e.g., caused by a scratch or asperity or like anomaly on the servo recording surface] or noise from the transducer or its associated circuitry. For example, workers have attempted to simply hi-frequency filter-out such signals with a lo-pass filter. Such filtration, however, is quite imperfect; for instance, characteristically causing a delayed feedback of the "true center" signal and other problems. The invention addresses this problem and provides a Fine-positioning arrangement especially apt for track-following, one that is immune from typical noise. The invention additionally, preferably, uses means that also report when one is within ±x uin. of "true" track-center. For instance, the invention, in its preferred form, focuses on x=50 uin and additionally can focus on a second "marker", closer to track center, for instance, at ±30 uin. from track-center.

Thus, it is an object hereof to address at least some of these problems and provide at least some of the mentioned features and advantages. Another object is to provide a Fine-positioning system for a disk drive.

BRIEF DESCRIPTION OF THE DRAWINGS

These and other features and advantages of the present invention will be appreciated by workers as they become better understood by reference to the following detailed description of the present preferred embodiments which should be considered in conjunction with the accompanying drawings, wherein like reference symbols denote like elements:

FIGS. 3, 3A, 3B are schematic circuit diagrams of a preferred circuit implementing this embodiment;

FIGS. 4, 4A–4D are idealized block diagrams of a preferred overall disk drive servo system apt for using this embodiment.

DESCRIPTION OF THE PREFERRED EMBODIMENT (FIGS. 1, 2)

Figure 1:
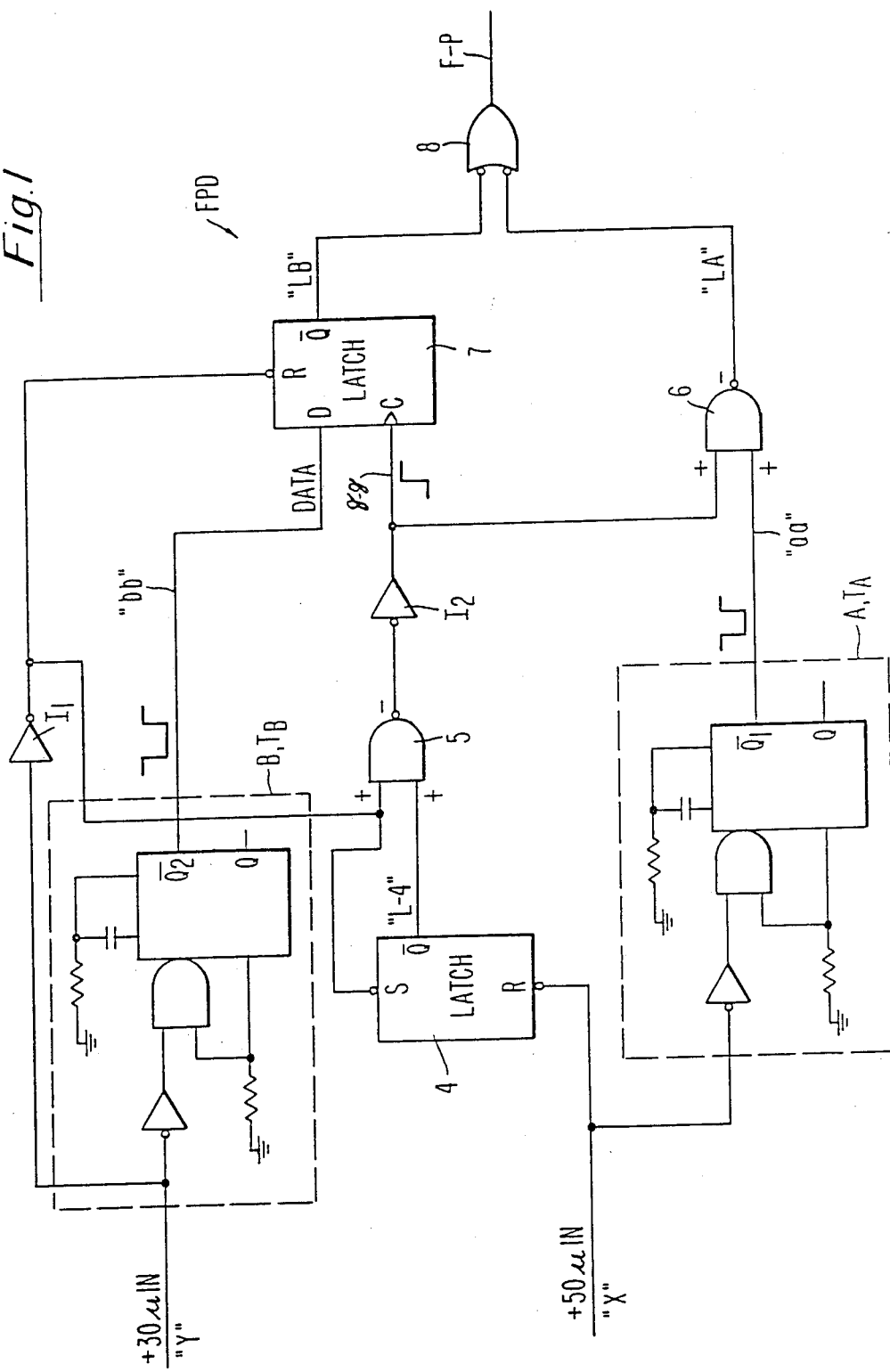
FIG. 1 is a schematic idealized block diagram of a Fine-position detector embodiment.
Figure 3:
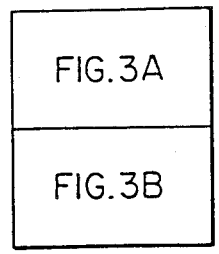
Figure 3A:
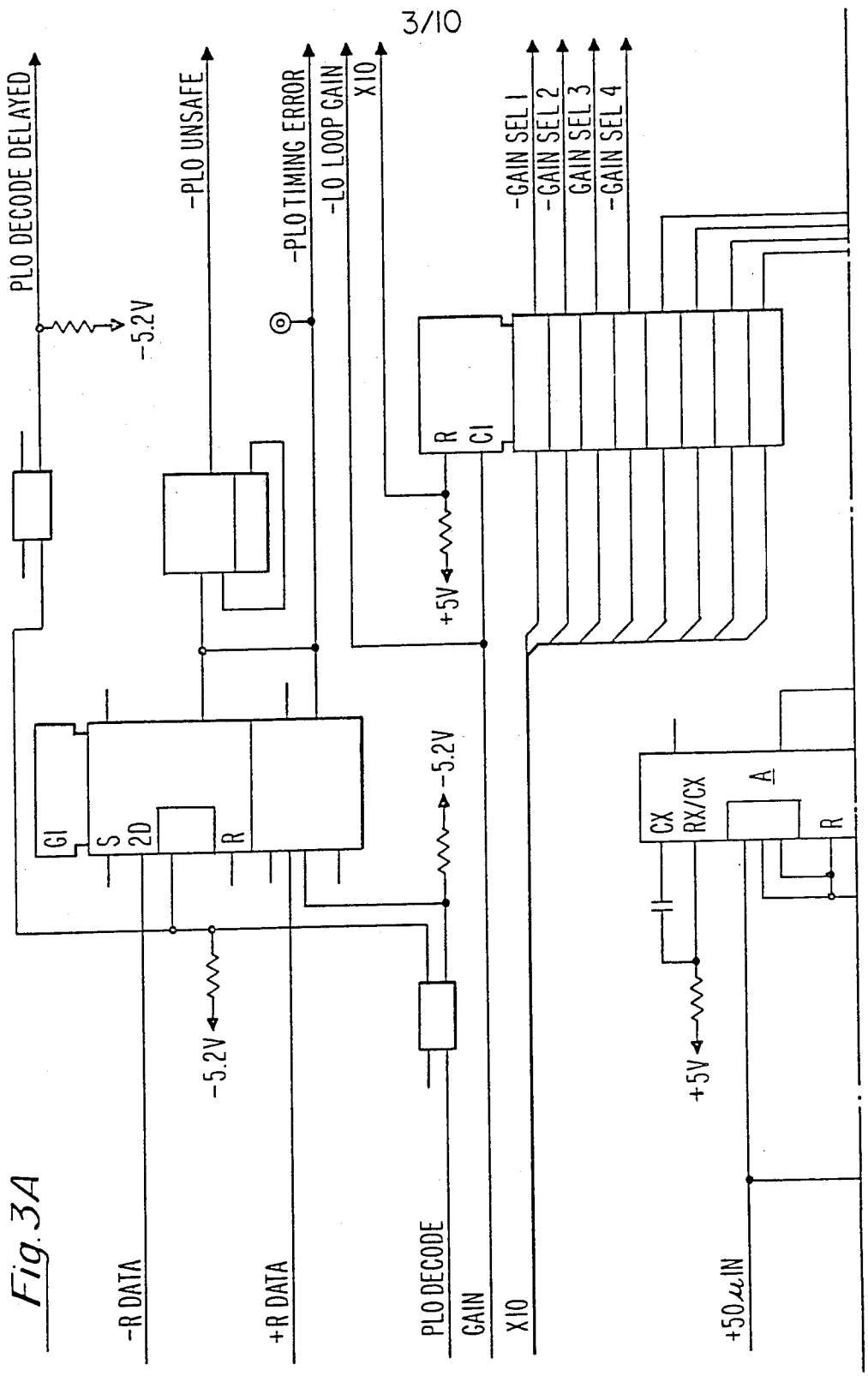

FIG. 1 schematically illustrates a "Fine-position detector" embodiment constructed according to principles of this invention (implemented in the circuit of FIG. 3). This, and other means discussed herein, will generally be understood as constructed and operating as presently known in the art, except where otherwise specified. And, except as otherwise specified, all materials, methods and devices and apparatus herein will be understood as implemented by known expedients according to present good practice.

Figure 2:
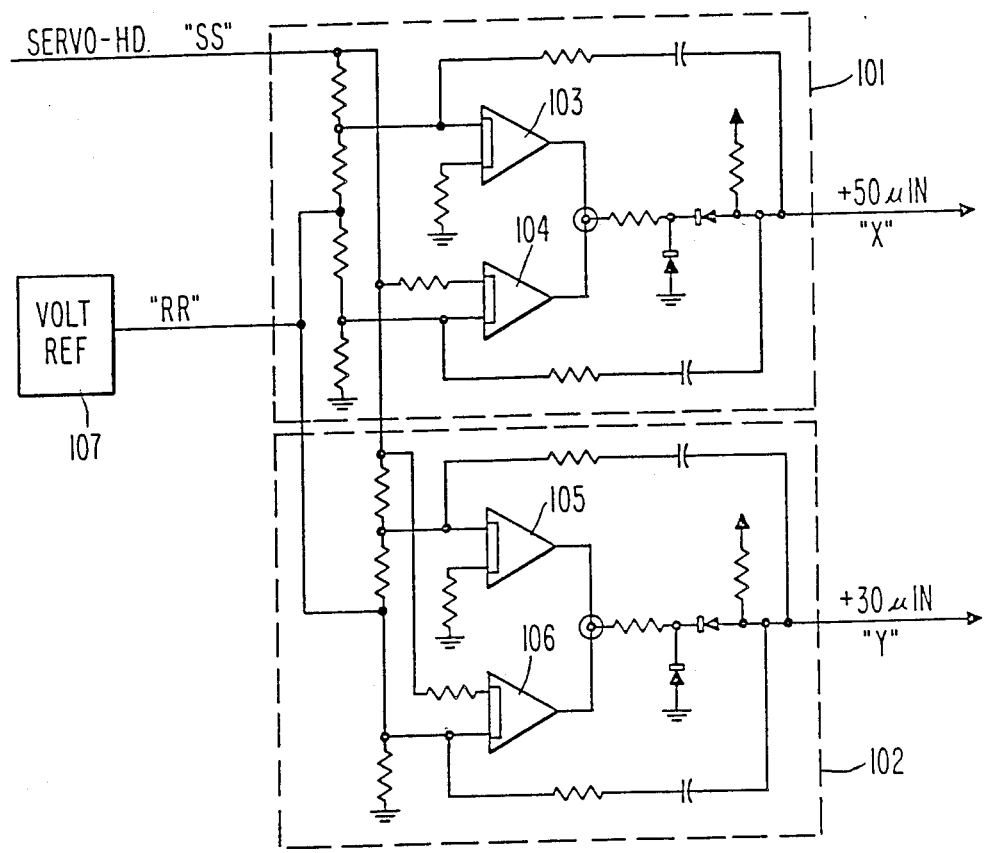
FIG. 2 is a like diagram of an associated comparator arrangement.

Preferred Embodiment, FIGS. 1, 2

FIG. 1 discloses, in block diagram form, a preferred "Fine position detector" arrangement FPD adapted to receive "marker signals" [X, Y], process these in a prescribed manner and indicate whether a servo transducer is truly "on-center" or not [see fine position output "F-P" indicating, for instance, whether the servo head is within ±50 uin of absolute track center].

Thus, speaking rather generally, Detector FPD in FIG. 1 includes a short-timer stage B adapted to receive input signals Y indicative of "near-approach" to absolute track center [e.g., preferably from a comparator arrangement, such as in FIG. 2, indicating for instance that servo head output "says" that it is within ±30 uin] and also including a companion "long-timer" stage A adapted to receive parallel "far-approach" input X from a similar source [e.g., comparator in FIG. 2] whereby the servo transducer "says" that it is truly within a greater distance of absolute track center [e.g., ±50 Uin, where X is greater than Y].

Figure 6:
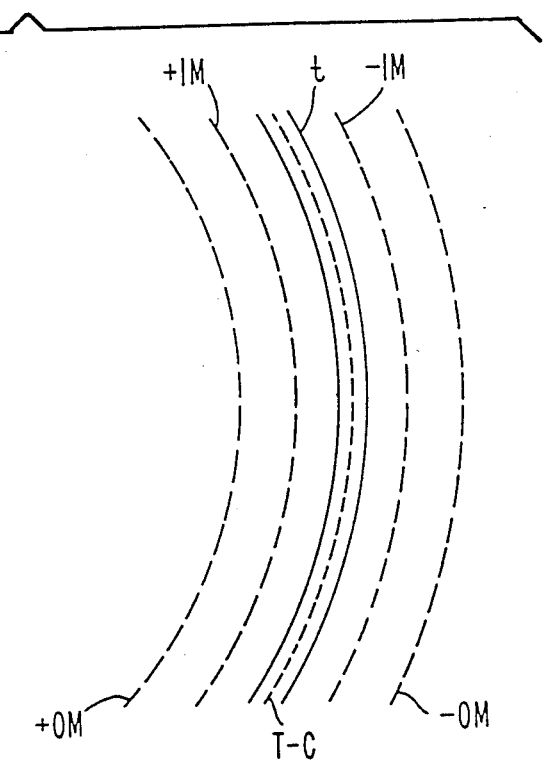
FIG. 6 is a very schematic fragmentary plan view of a portion of a disk track with "inner/outer markers" indicated.
Figure 4A:
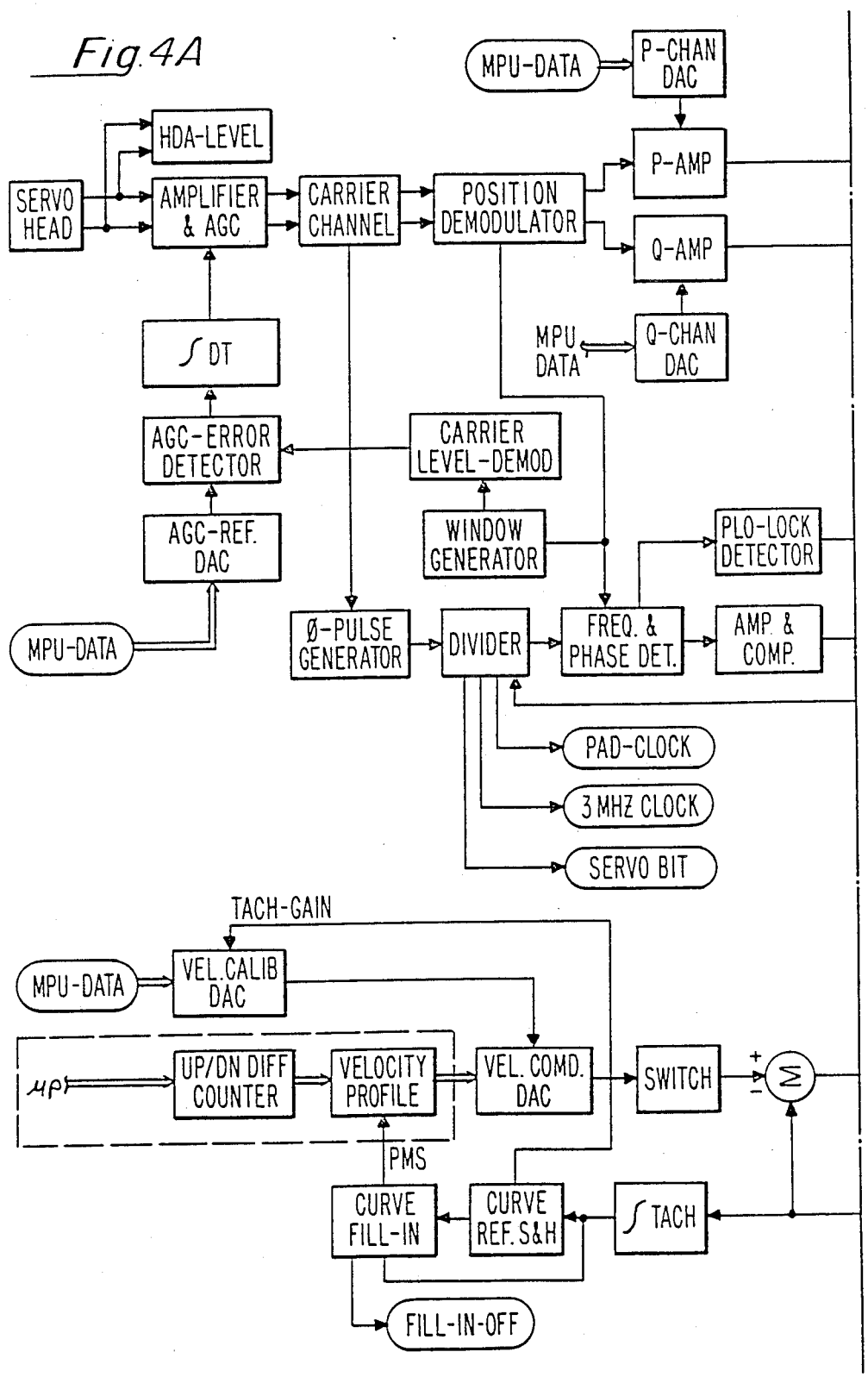
Figure 4B:
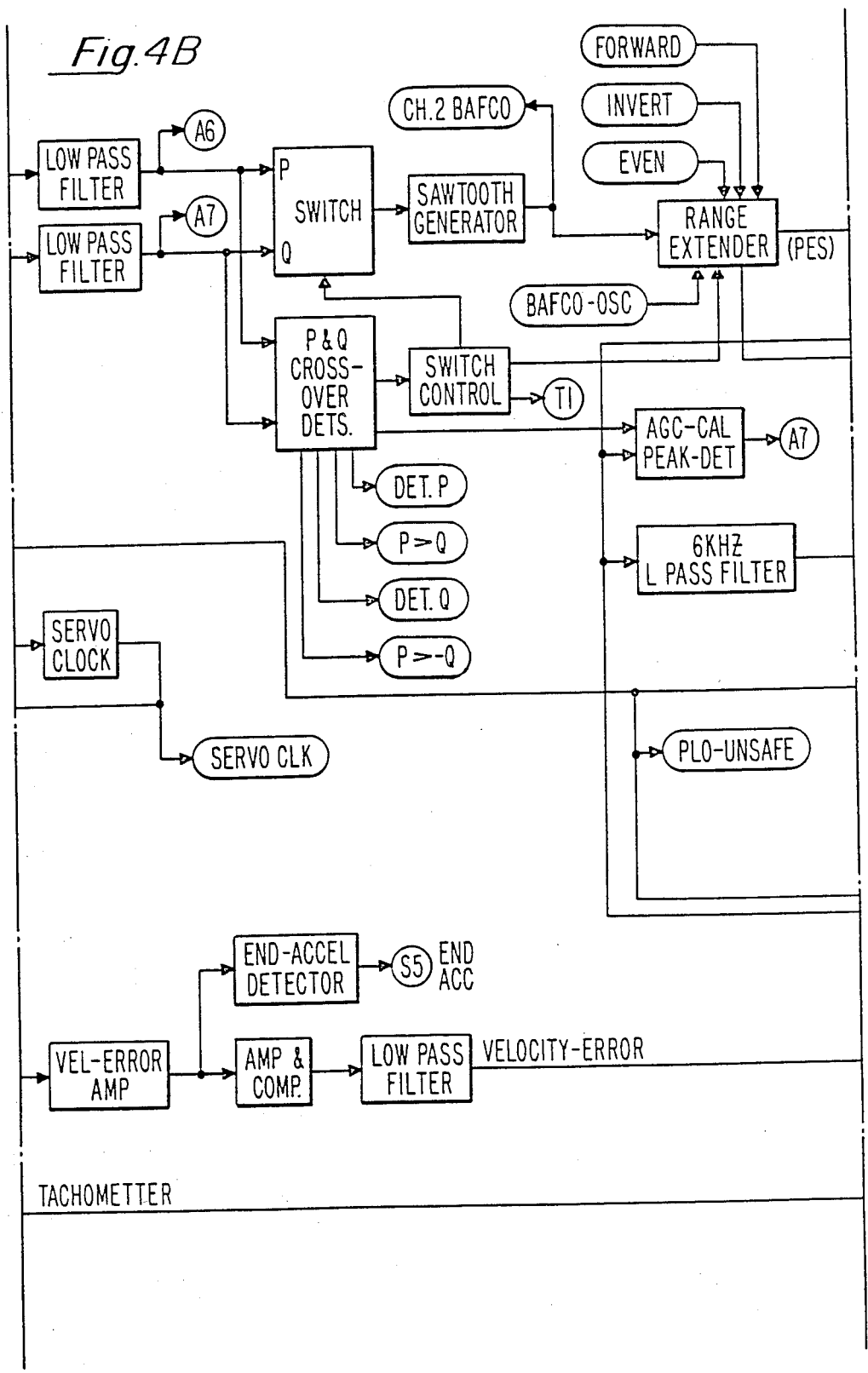
Figure 4D:
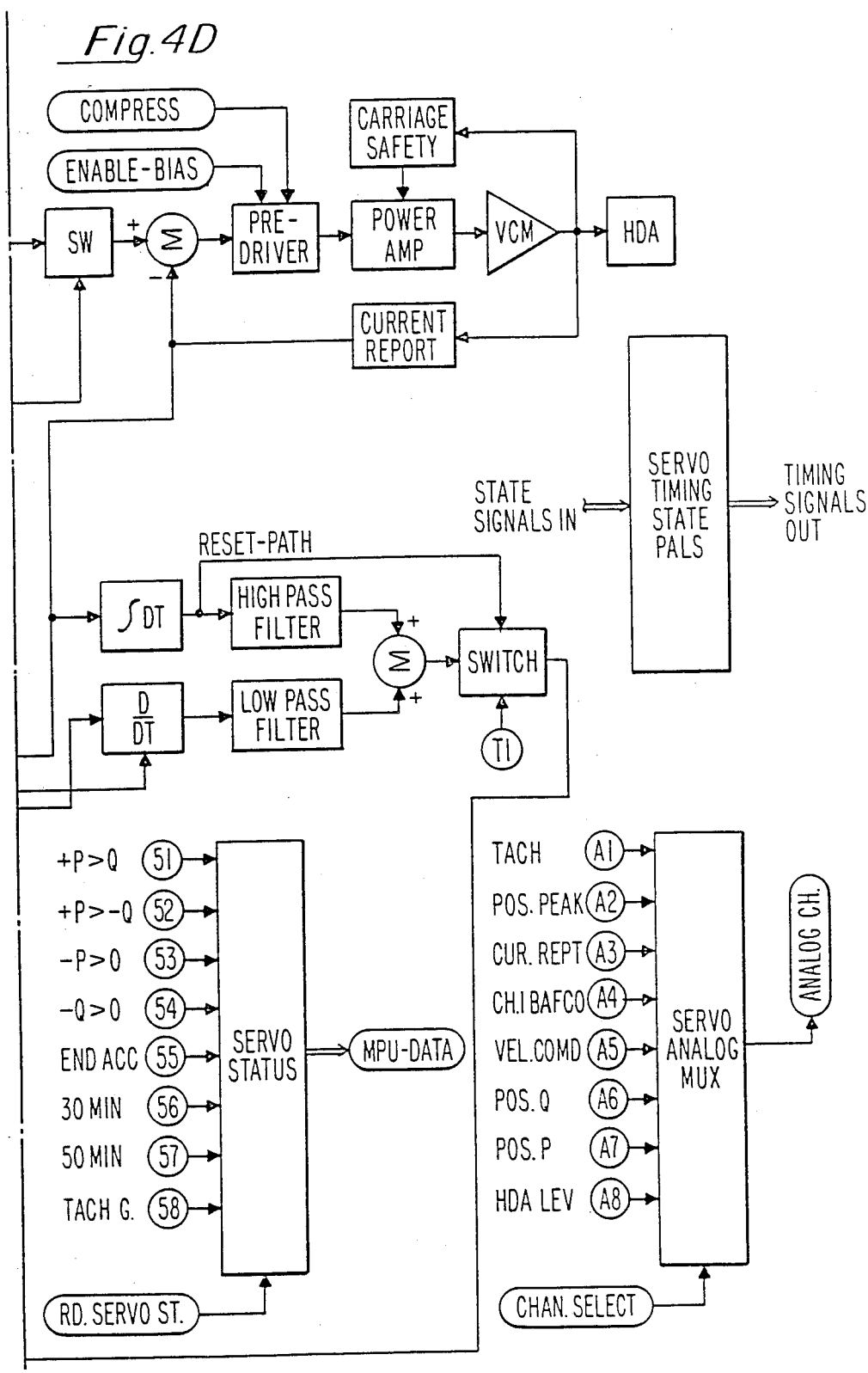

This may be better understood by reference to FIG. 6, a very schematic, highly-simplistic and idealized sketch of an exemplary track t on a magnetic disk face, where "T-C" represents absolute "center" of Track t. Here, an exemplary "near-approach" (e.g., ±30 uin.)of track-center T-C may be visualized as an imaginary set of "inner-markers" +1M, −1M, while an exemplary "far-approach" (e.g., ±50 uin.) of track-center T-C may be similarly visualized as an imaginary set of "outer markers" +0M, −0M. As workers will recognize, the subject system is set up to define a servo transducer Ts as "ON-CENTER" when it is inside outer markers ±0M (with certain possible exceptions —e.g., initial or recentering may require that Ts come inside the inner markers ±1M of a selected track). Thus, outputs "aa", "bb" from Timers A, B, respectively, may be characterized as "Timed violation-signals".

The output from timer B will be generally understood as produced only after a relatively "short" delay-time $T_B$; whereas the output from stage A will be produced after a somewhat longer timed delay $T_A$ [Time $T_A$ greater than $T_B$]. These timer outputs will be seen to be applied, through logic means such as indicated in FIG. 1, to finally indicate, by a "Fine-position output" F-P that the servo head really is "on-center" as here defined by the system [here "F-P" "low" preferably indicates that the servo head is within ±50 uin of the true-center of a selected servo track; whereas "$\overline{F\text{-}P}$" or high indicates that the head is farther away from track center as understood in the art; or, in terms of FIG. 6: F-P indicates head within outer markers ±0M].

Once signal Y starts to go "low", it starts timer B, then once timer B has timed-out $T_B$ seconds, it issues violation output "bb" applied to latch 7. Latch 7 is activated to produce its "violation" output "LB" when it also receives a later violation signal "g—g", but only after output "bb" appears; thus, latch 7 requires that one latch-in a near-approach violation indication for $T_B$ seconds, followed by a far-approach violation signal. Latch 7 is reset by "Y" signal.

More particularly, the output "bb" "violation signals" from timer stage B is applied to the input of an output latch 7 which, in turn, is designed to issue an output "LB" applied to an Output Gate 8 as discussed below. Conversely, timer stage A is adapted to issue an output "aa" applied through a NAND gate 6 which, subject to certain logic controls, in turn issues an output "LA" applied to gate 8.

Generally speaking, appearance at output gate 8 of a proper signal causes it to issue an "On-Center" output pulse "F-P", whereas absence of these conditions will be reflected by the "negate" thereof, namely $\overline{F\text{-}P}$ (i.e., Hi or absence of F-P="Lo").

The far-approach input X is also applied to a second latch 4 adapted to issue a first output "L-4" controlling an associated NAND gate 5. Signals L-4 with other associated logical inputs to gate 5 can cause a logical output "gg" [e.g., through an inverter $I_2$] to latch 7 as well as to a NAND gate 6 indicating a concurrence of "violation signals" X, Y]. Preferably, the near-approach input Y is also directed to the other leg of NAND gate 5 [e.g., preferably via an inverter $I_1$ ] in conjunction with a second x-output from latch 4 to cause gate 5 to issue g—g.

NAND Gates 5, 6

It will be assumed that each NAND gate 5, 6 operates conventionally, giving a "Lo" output ("—"indicating "violation") on reception of two Hi inputs (+, as indicated in FIG. 1); otherwise its output is Hi (+).

For NAND gate 5 assume the following:

1.—Initially, latch 4 has set "Lo" and $\overline{Q}$ Lo; also with head "ON", X and Y will be Hi until "crossed", whereupon they go "Lo";

2.—Crossing the ±30 uin. marker drives Y Lo, making the output of $I_1$ Hi to gate 5; and so setting S Hi ($\overline{Q}$ still Lo);

3.—Y Lo will start Timer B, driving output "bb" Lo until it times-out ($t_B$ seconds).

Now, if X goes Lo before $t_B$ seconds elapse, it will reset latch 4, making $\overline{Q}$ Hi to gate 5. This will enable a Lo output to be inverted to Hi by $I_2$ as Hi input g-g to latch 7, acting to clock-in "bb". But latch 7 won't output violation signal LB—for this "bb" must be Lo, or timed-out, when g—g clocks in.

4.—Thus, if "bb" has timed-out (gone Lo→Hi) by the time g—g clocks—in, violation output LB will signal gate 8 that ON-Center was lost (i.e., head "OUT'-')—corresponding to TEST III below.

For NAND gate 6, assume the following:

1.—Initially, neither X nor Y indicates violation (are Hi, i.e. head is "ON"); thus $I_1$ applies Lo to gate 5, so $I_2$ applies Lo to gate 6; and Timer A output to 6 is Hi;

2.—When head crosses ±50 uin. marker X goes Lo, starting Timer A, whose output to gate 6 goes Lo, stays Lo for $t_A$ seconds. Now, the $I_2$ output will go Hi (Hi input to gate 6), having lost both Y and X inputs (head previously crossed ±30 uin.).

3.—Thus, Timer A times out and applies a Hi input to gate 6, to enable a Lo ("violation") output "LA" to gate 8, which will responsively indicate "OUT" ($\overline{F\text{--}P}$)—corresponding to TEST II below.

Although the logic could be otherwise arranged, a "high+ output from gate 8 will here be understood to indicate "off-center" whereas a "low" output indicates "On"; conversely, for either the X or Y inputs a "high'-'condition indicates "On-Center" whereas a "low" condition indicates "Off-Center".

The foregoing arrangement and associated logic will be seen as adapted to subject the servo head output signals SS [see FIG. 2], as processed in Comparator stages 101, 102, to produce the mentioned "near-approach", "far-approach", signals (Y, X) to satisfy a given algorithm intended to test whether the servo head is truly "On-Center" as defined by below.

TABLE A: "OUT" TESTS

A servo head will be understood as "OFF-CENTER" or "OUT", if it satisfies any of the following TESTS I, II OR III:

TEST I:

The servo head is "OUT" regarding any servo track that it approaches, until it has crossed a "near-approach" margin (e.g., ±1M in FIG. 6; here assume 1M=30 uin.);

TEST II:

The servo head is "OUT" thereafter once it has passed ±OM [that is outside arbitrarily-defined "far-approach" margin from true absolute track center] for time $T_A$; i.e., if the associated "distant comparator output" [output X from Comparator 101] indicates "OUT" for a prescribed "long-time" period $T_A$. [Preferably this "far-margin" like ±0M in FIG. 6, is ±50 uin. here].

That is, the 101 output X goes "low", or false (this assumed as a negative-going signal) for $T_A$ time, causing the output aa (violation signal) from timer stage A to produce an "OUT" output from gate 8, this represented, preferably here by an $\overline{F\text{-}P}$ [or gate 8 going "high", or outputting a positive-going signal $\overline{F\text{-}P}$].

TEST III: The servo head is "OUT" if the "near-approach timed-violation" signal Y goes false or "low" [output of Comparator 102] and stays low for time $T_B$, so as to time-out output "bb" from timer stage B, AND, also if the "far-approach" output X similarly goes low only after this [that is, a negative-going signal X appears at latch 4, enables gate 5, etc., and at latch 7 causes a clock-signal input g—g to clock-in a Hi state for timer output "bb", so that latch 7 in turn issues an "Off-Center" output "LB" applied to gate 8. In turn, this induces an "OUT" or Off-Center signal $\overline{F\text{-}P}$ from gate 8 as mentioned above. [Assume that F-P is a positive-going or "high" signal.]

These TESTS might be summarized as:

I—"OUT" initially until cross ±1M (FIG. 6); "OUT" thereafter if either:

II—violate ±0M for $T_A$ seconds, or

III—violate ±1M for $T_B$ seconds, and then violate ±0M.

[in III can also require same-polarity for 1M, 0M].

Note: Technique allows one to select, and easily change, the number and distance of "marker limits" (e.g., 1M, 0M and the time if any, of a required "violation".

Workers will greatly value this.

Summarizing The Three Tests Above

I—Initially, the head is "OUT" until the "near-approach" signal Y appears (no time duration here, though such is feasible); —applies after ±0M crossed;

II—Thereafter (i.e., head sensed crossing inner marker ±1M), the head is "OUT" if the "far-approach" signal X goes negative ("low") and stays so for $T_A$ seconds, to induce a "timed-violation" output "aa" from Timer A. This should mean, here, that the head crossed the ±50 uin. marker and stayed beyond it (didn't cross-back for $T_A$ seconds). Output "aa" will cause gate 8 to issue an "OFF-CENTER" output $\overline{F\text{-}P}$. After this, must again cross ±1M (I. above);

III.—Or, after head within inner marker ±1M, it then is signalled as "OUT" if it crosses ±1M and stays beyond it for $T_B$ seconds; and then crosses 0M—that is, if the "near-approach" signal Y goes negative and stays so for $T_B$ seconds; then the "far-approach" signal X goes negative—together these events cause application of "bb" to latch 7, then application of "L—4" to gate 5 and "g—g" to latch 7; latch 7 responsively issues "LB" to gate 8 which then issues $\overline{F\text{-}P}$, meaning "OUT".

Negative Conditions

The foregoing will be understood by workers in the art to rule-out several "error" conditions which might otherwise erroneously indicate an "Off-Center" condition, that is:

1. Drop in the near-approach and far-approach signals X, Y simultaneously (both go low)—this would usually indicate the presence of a spike or like noise coming in on one or both of the X, Y lines, a failure condition, and thus be a condition to be ignored [unless the X input indicates off-center for $T_A$ seconds, of course].

2. If the near-approach signal Y goes low indicating off-center, it requires that the head proceed farther off-center to pass the outer marker, making the X signal later go low—thus a head which has wandered outside the near-marker is still considered "on-center" unless it thereafter passes the outer marker, driving the X signal low, too. In other words, the system defining on-center as within ±50 uin. tolerates head wander outside the ±30 uin. marker but not as far as ±50 uin. This will be seen by workers to remove a lot of "jitter" and erroneous "off-center" signals from the system.

3. And neither the near-approach or far-approach crossing signals Y, X need to be held valid to indicate "off-center" unless they persist for a respective time period [$T_A$ for X; $T_B$ for Y, as mentioned above]. This will ignore transient or noise signals either from the servo recording face, from the transducer or from associated circuitry—typically a noise spike which is very brief and thus may be ignored.

4. And, once the head has been detected as truly going beyond the far-marker (here ±50 uin.) and the circuit has verified this, one cannot regain Fine-position [that is, an on-center output from gate 8] until the circuit says that the head is back within the near-approach or 30 uin. distance. Also, at startup the circuit makes you get within ±30 uin., but if you thereafter wander beyond 30 uin. but not as far as ±50 uin., you are not reported as being "Off-Center" until the circuit verifies that head has gone beyond 50 uin. and done so $T_B$ seconds after passing 30 uin. marker. This condition will be seen as a great convenience in ignoring minor head-wandering, yet still using the inner marker in special instances.

Although workers will recognize that other means may be used, the "near-approach" and "far-approach" signals X, Y result from a set of Near-Comparator and Far-Comparator stages 102, 101, respectively which output respective signals X and Y, based upon input of the servo head read signals SS, combined with a voltage reference signal RR from a reference voltage stage 107. Reference voltage RR is applied to the inputs of comparators 101, 102 and, after processing by voltage divider means, and application to a pair of comparator means, issues the mentioned outputs X, Y. Comparators 103, 104 in Comparator stage 101 operate to output a signal X representing a voltage-encoded distance (±0M) from track-center T-C as known in the art, comparing raw output SS from a servo head with reference voltage RR, and indicating by negative-going signal X that "SS" exceeds "RR". Comparators 105, 106 in stage 102 function similarly to issue Y. Reference voltage RR will be understood as establishing a threshold level in terms of volts per uin. distance from track-center-line; similarly the position signals SS from the servo transducer indicate distance from center line in terms of voltage (as detected by the servo transducer). Workers in the art will contemplate other equivalent means for providing such inputs X, Y, indicating whether or not a transducer has passed a respective inside margin or outside margin marker.

The schematic in FIG. 3 shows a preferred circuit arrangement implementing the detection system of FIG. 1, (with like elements identically marked).

Reprise:

The purpose of the Fine Position detection scheme is to report to the system when the servo head is "off-track-center" by a specified number of micro-inches (50 in this case). One feature of this design is to distinguish between spikes (scratches) on the disk surface and actual head movement. This is accomplished by using position comparators (101, and 102) to determine when the position signal indicates ±50 and ±30 micro-inches of error. The signals generated from 101 and 102 (50 and 30 uin.) are then fed to one-shot timers A and B. These timers along with latches 4 and 5, are combined to generate "Fine Position"; i.e., to report to the microprocessor that the servo head is truly "out" ("Off-track") and that it is unsafe to perform write operations.

Definition of Signals

±30 uin.: "HI" indicates that the position signal reports that there is less than ±30 uin. of error. (Hence head is "on" track). "LO" indicates that the position signal reports that there is more than ±30 uin. of error. (Head is "off" track.)

±50 uin.: "HI" indicates that the position signal reports that there is less than ±50 uin. error. (Head "On" track.) "LO" indicates that the position signal reports that there is more than ±50 uin. of error. (Head is "out".)

Fine-Pos'n (F-P): "LO" (F-P) indicates that the servo head is truly "on" track and that it is okay to perform write operations. "HI" ($\overline{F\text{-}P}$) indicates that the servo head is truly "off" track and that "write" should be suspended.

"Fine Position" (F-P) will go "HI" ($\overline{F\text{-}P}$ or "false") if: [Criterion 1] ±50 uin. goes "lo" for $t_B$ seconds (Time of Timer B) after ±30 uin. goes "lo"; or [Criterion 2] ±50 uin. stays "lo" for $t_A$ seconds (time of Timer A).

Figure 4:
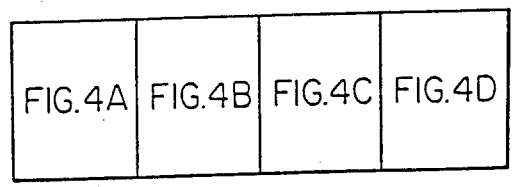
Figure 5:
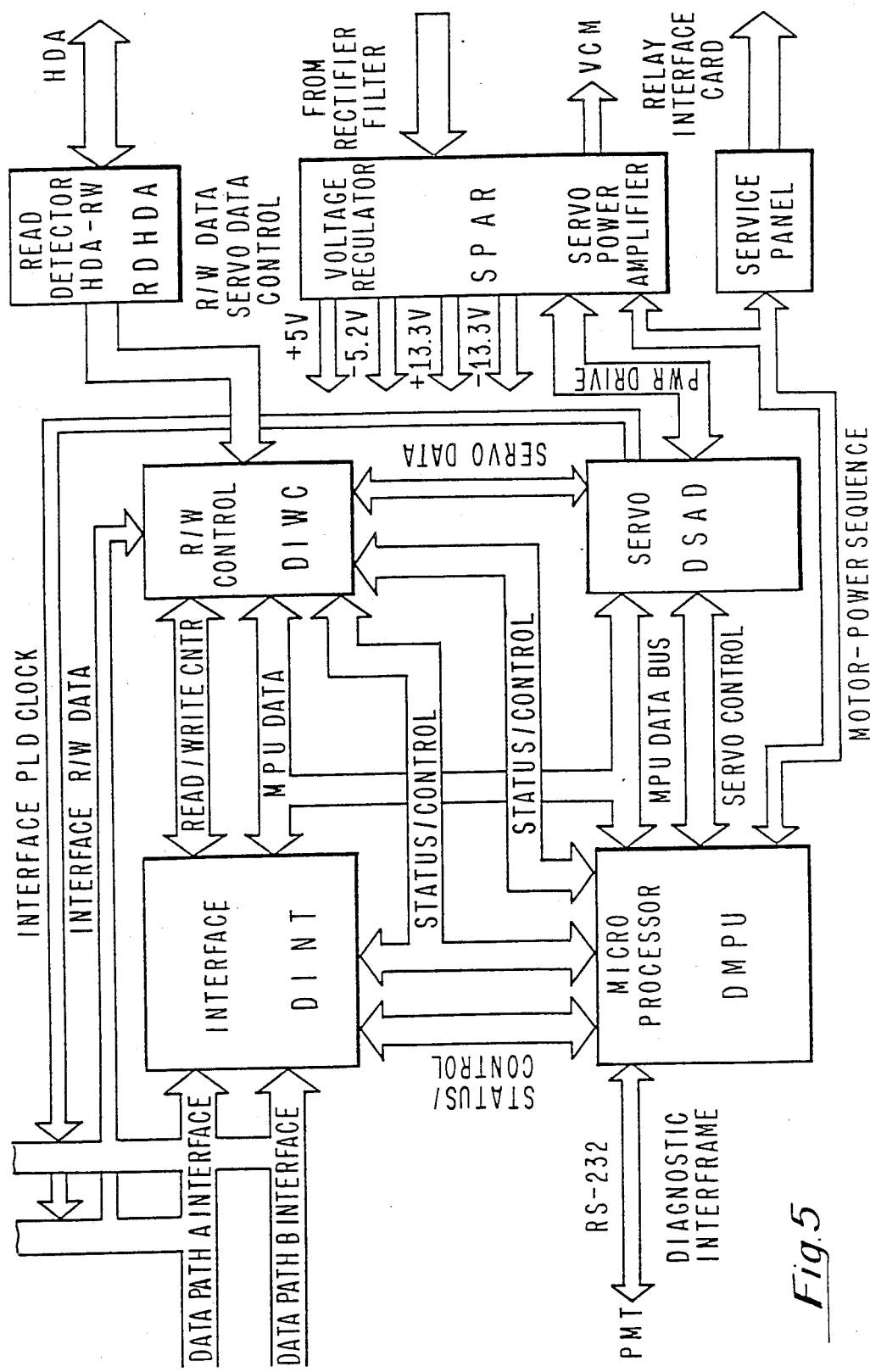
FIG. 5 is a like diagram of a preferred actuator control system for a single disk stack (spindle), apt for use with the embodiment.

FIG. 4 is a schematic, simplified block diagram of an overall disk drive servo arrangement apt for using the invention (e.g., note 30 uin./50 uin. detect stages D-1, D-2, "ON-CENTER" output "F-P", and "write-inhibit" stage WI). And, FIG. 5 is a schematic simplified block diagram of functional control (e.g , R/W, servo) elements for each disk spindle (actuator or HDA) unit in a disk drive arrangement apt for using the invention.

It will be understood that the preferred embodiments described herein are only exemplary, and that the invention is capable of many modifications and variations in construction, arrangement and use without departing from the spirit of the invention.

Further modifications of the invention are also possible. For example, the means and methods disclosed herein are also applicable to other high density disk files, as well as to related systems. Also, the present invention is applicable for enhancing other forms of servo control.

The above examples of possible variations of the present invention are merely illustrative. Accordingly, the present invention is to be considered as including all possible modifications and variations coming within the scope of the invention as defined by the appended claims.

What is claimed is:

1. A disk drive servo system for controlling positioning of a servo actuator, based, in part, on servo signals "ss" from servo transducer means $T_S$, read-out from recorded servo data, this system including:

a plurality of servo referencing means $R_n$, each adapted to indicate whether said transducer means $T_s$ has deviated from track-center T-C by one of several different respective deviation-distances ±dn, each referencing means $R_n$, being arranged and adapted to issue a respective positive output deviation signal $S_n$, indicating that transducer means has so deviated beyond its respective deviation distance ±dn, or to issue a negative output deviation signal $\overline{S_n}$ indicating that it has not so deviated;

a plurality of timer stages $TT_n$, each adapted to receive a respective deviation signal Sn or $\overline{Sn}$ and each issue a respective deviation-time output signal t-$S_n$ indicating that a respective positive deviation Sn has been continuously applied thereto for a prescribed respective time $t_n$; and logic circuit means, including a logic output stage L-0 adapted to issue negative output signals $\overline{f\text{-}p}$ indicating that said transducer means $T_s$ is OFF-CENTER as defined by the logic circuit means.

2. The invention of claim 1 where at least two such deviation-distances ±$d_1$, ±$d_2$, are so established, with associated referencing means $R_1$, $R_2$; respective outputs $S_1$ or $\overline{S}_1$ and $S_2$ or $\overline{S}_2$, therefrom; and with associated respective timer stages TT, $TT_2$ adapted to issue respective output signals T-S, T-$S_2$, representing presence of a respective deviation-indicating signal $S_1$, $S_2$ for a respective time period $T_1$, $T_2$.

3. The invention of claim 2 where output stage L-0 comprises gate means adapted to issue said OFF-CENTER indicating signals $\overline{f\text{-}p}$ when transducer $T_s$ deviates by ±d, for $T_1$ seconds; or
   when $T_s$ deviates by ±$d_2$ for $T_2$ seconds, where ±$d_3$ > ±$d_2$, and thereafter $T_s$ further deviates by ±d, also.

4. The invention of claim 3 where the system is farther adapted and arranged to NOT issue ON-CENTER output signals f-p, but to issue OFF-CENTER output signals $\overline{f\text{-}p}$, unless and until transducer means $T_s$ comes with ±d, of absolute track-center.

5. The invention of claim 4 where the system is further arranged and adapted to apply said OFF-CENTER output signals $\overline{f\text{-}p}$ to inhibit operation of associated recording means.

6. The invention of claim 5 where are included write-control means W-C whereby said OFF-CENTER output signals $\overline{f\text{-}p}$, or contrary ON-CENTER output signals f-p, are applied to inhibit said recording means, or to enable it.

7. The invention of claim 6 wherein said Write-Control means W-C is microprocessor.

8. The invention of claim 1 where said referencing means each comprise a like comparator circuit together with reference-signal means.

9. The invention of claim 5 where said deviation-indicating signals $S_1$, $S_2$ are logically combined to set an output-latch means $LL_o$ and said output stage L-0 comprises gate means controlled, in part, by said latch means $LL_o$.

10. The invention of claim 9 where said distance $d_1$ constitutes several dozen uin. and $d_2$ is at least 1.25$d_1$.

11. A disk drive servo system for controlling positioning of a servo actuator, based, in part, on servo signals "ss" from servo transducer means $T_S$, read-out from recorded servo data, this system including:

a plurality of servo referencing means $R_n$, each adapted to indicate whether said transducer means $T_s$ has deviated from track-center T-C by one of several different respective deviation-distances dn, each referencing means $R_n$, being arranged and adapted to issue a respective positive output deviation signal $S_n$, indicating that transducer means has so deviated beyond its respective deviation distance dn, and to issue a negative output deviation signal Sn indicating that it has not so deviated;

and output-logic means adapted to receive and combine the outputs $S_n$, $\overline{S}_n$ of said referencing means, process them and responsively indicate the "on-track" status of said transducer means $T_s$.

12. The system of claim 11, wherein said logic means is arranged and adapted to exclude noise and other error conditions apt to comprise this indication of "on-track" status.

* * * * *